US011780471B1

(12) United States Patent
Beilouni

(10) Patent No.: US 11,780,471 B1
(45) Date of Patent: Oct. 10, 2023

(54) SYSTEM FOR DETERMINING A STATE OF AN OBJECT USING THERMAL DATA

(71) Applicant: Zoox, Inc., Foster City, CA (US)

(72) Inventor: Yasser Beilouni, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 120 days.

(21) Appl. No.: 17/461,134

(22) Filed: Aug. 30, 2021

(51) Int. Cl.
*B60W 60/00* (2020.01)
*B60W 30/095* (2012.01)
*G06T 7/70* (2017.01)

(52) U.S. Cl.
CPC .... *B60W 60/0027* (2020.02); *B60W 30/0956* (2013.01); *G06T 7/70* (2017.01); *B60W 2420/40* (2013.01); *B60W 2554/4041* (2020.02); *B60W 2554/4046* (2020.02); *B60W 2554/80* (2020.02); *G06T 2207/10048* (2013.01); *G06T 2207/30252* (2013.01)

(58) Field of Classification Search
CPC ......... B60W 60/0027; B60W 30/0956; B60W 2554/4041; B60W 2554/80; B60W 2554/4046; B60W 2420/40; G06T 7/70; G06T 2207/10048; G06T 2207/30252
USPC ......................................................... 701/26
See application file for complete search history.

(56) References Cited

U.S. PATENT DOCUMENTS

| 10,445,599 B1 * | 10/2019 | Hicks ..................... G06V 20/58 |
| 10,467,903 B1 * | 11/2019 | Chase ..................... B60W 10/20 |
| 2019/0180502 A1 * | 6/2019 | Englard ................. G01S 7/417 |
| 2020/0082248 A1 * | 3/2020 | Villegas ................ B60W 40/02 |

* cited by examiner

*Primary Examiner* — Tyler J Lee
*Assistant Examiner* — Tiffany P Ohman
(74) *Attorney, Agent, or Firm* — Lee & Hayes, P.C.

(57) ABSTRACT

Techniques associated with predicting behaviors and states of objects in a physical environment using thermal data.. In some cases, the system may be configured to determine heat signatures of individual features of an object and based on a combination of heat signatures determine a predicted behavior and/or a state of the object. The system may also utilize the thermal data to determine a confidence associated with predicted behavior and/or states of the object.

20 Claims, 8 Drawing Sheets

SYSTEM FOR DETERMINING A STATE OF AN OBJECT USING THERMAL DATA

BACKGROUND

Autonomous vehicles may navigate along routes. For example, when the autonomous vehicles receive requests to travel to destination locations, the autonomous vehicles may navigate along routes from the current locations of the autonomous vehicles to a pickup location to pick up a passenger and/or from the pickup location to the destination locations. While navigating, the autonomous vehicles may detect other objects in the environment and predict their behavior. Predicting the behavior of each object may include a degree of uncertainty that may create challenges for the vehicle to safely navigate through the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
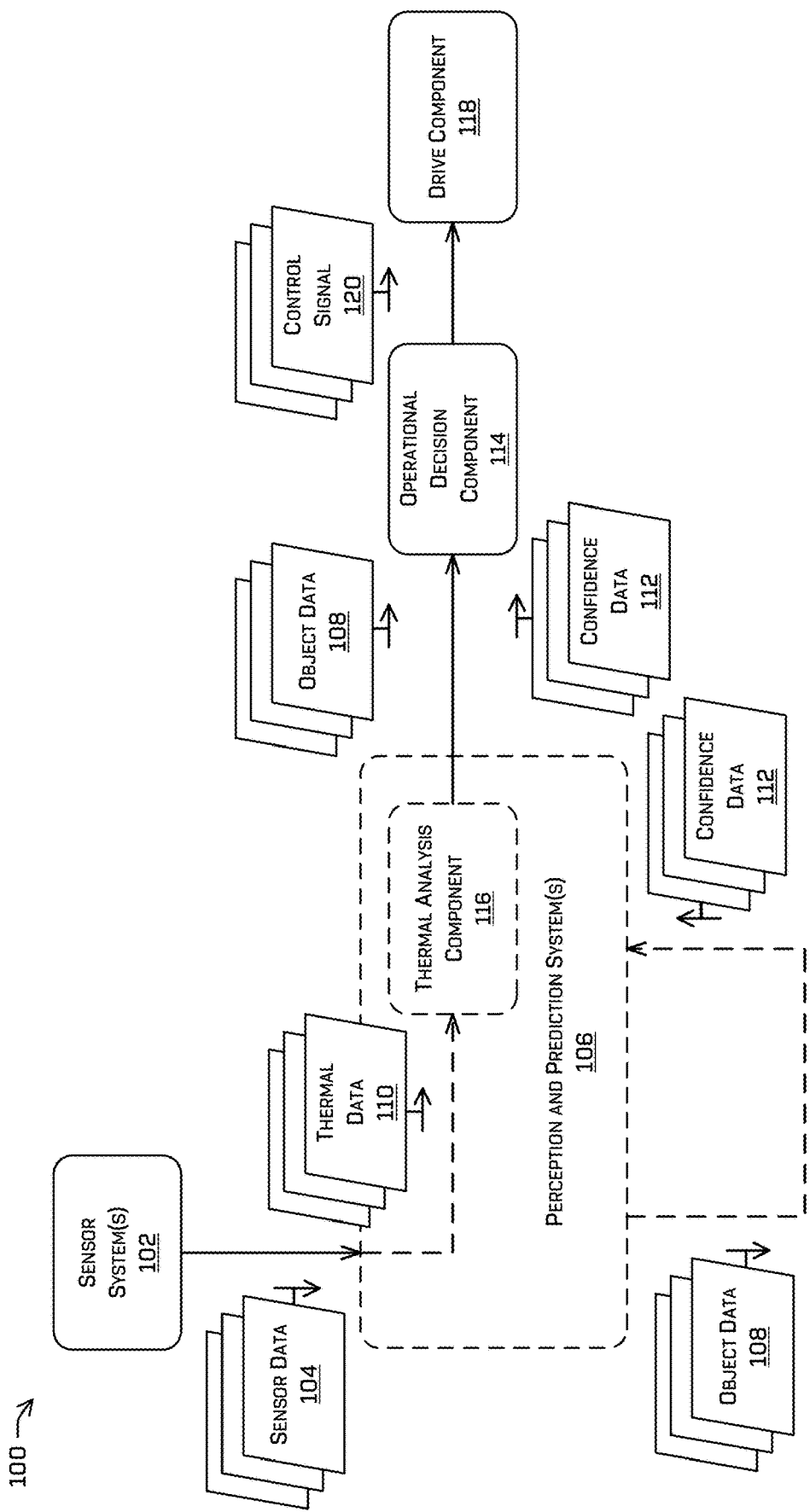
FIG. 1 is an example block-diagram illustrating an example architecture associated with operational decisions of an autonomous vehicle, in accordance with embodiments of the disclosure.

As discussed herein, autonomous vehicles may navigate through physical environments. For example, when an autonomous vehicle receives a request to travel to a destination location, the autonomous vehicle may navigate along a reference trajectory or route from the current location of the autonomous vehicle to a pickup location to pick up a passenger and then from the pickup location to the destination location. While navigating, the autonomous vehicle may encounter dynamic objects (e.g., vehicles, pedestrians, animals, and the like), static objects (e.g., buildings, signage, parked vehicles, and the like) in the environment. In order to ensure the safety of the occupants and objects and make operational decision, the system and vehicle, discussed herein, may predict a behavior or behaviors of the dynamic objects as well as a current state. The predicted behaviors and/or the states may include a confidence value (e.g., a numerical value representative of the systems confidence that the dynamic object will conform to the predicted behavior).

For example, the autonomous vehicles may operate based on sensor data collected by one or more sensors. The autonomous vehicles may utilize the sensor data to detect, classify, and track the dynamic objects in the environment. The detected objects and characteristics of those objects (e.g., distance from autonomous vehicle, type or class of object, velocity, heading or direction of travel, etc.) as well as the location or position of the objects within the environment in addition to structures, elements, surfaces, and the like may be generally referred to herein as perception data as well as other environmental data captured by one or more sensors associated with the autonomous vehicle. In general, the autonomous vehicle may utilize the perception data to determine current states of the objects and to predict future behaviors of the objects in the environment. The perception data, the states, and the predicted behaviors may, in some instances, have uncertainty associated with them (e.g., the object may have a range of predicted behaviors, movements, trajectories, and/or the like). In some cases, the perception data and the predicted behavior are used to make operational decisions of the autonomous vehicle and ensure safety of any passengers.

In some cases, the uncertainty may be modeled as a confidence value associated with the predicted behavior and/or state of object. As an illustrative example, the system may assign a state to a parked automobile, such as active or inactive (e.g., running or off) based on the perception data. In this example, if the automobile is off, the autonomous vehicle may be able to, at a high level of confidence, predict that the automobile will remain stationary. However, if the parked automobile is active, the autonomous vehicle may experience greater difficulty in determining the predicted behavior (e.g., the autonomous vehicle is less confident in each predicted behavior). The system and vehicle, discussed herein, may utilize thermal sensor data (e.g., heat data or heat maps) associated with dynamic objects and/or components of dynamic objects to increase the accuracy and/or confidence with respect to any given predicted behavior and/or state. For instance, in the example above, if a predetermined combination of the wheels, engine, exhaust pipe, lights, and the like of the automobile register (e.g., have a heat signature above associated thresholds) in the thermal sensor data, then the autonomous vehicle may increase the confidence value associated with predicted behaviors associated with a dynamic action and/or state of the automobile. Similarly, the autonomous vehicle may decrease the confidence value associated with predicted behaviors associated with a static position and/or state of the automobile action.

In some examples, in addition to utilizing detected thermal signatures of combinations of components of the dynamic object, the autonomous vehicle may analyze thermal signatures of combinations of related interacting dynamic objects. For example, the thermal sensor data may represent the automobile of the prior example and an individual or individuals positioned within or about the automobile. In this example, the autonomous vehicle or a system associated therewith, may segment and classify the thermal sensor data to identify the automobile and the individuals as distinct objects. The autonomous vehicle may also segment and classify the thermal data associated with the individual components of each identified object as discussed above. In this example, the autonomous vehicle may utilize the thermal data or signatures of the individuals and the vehicle components to, at least in part, determine the confidence value of predicted behaviors and/or states. For instance, if the individual is positioned in the driver seat and the engine is slightly warm and the tires are cool, then there is an increased chance that the driver recently turned on the automobile and that the automobile is more likely to move. Alternatively, if the individual is in the driver seat and the tires are warm, it is more likely the that the automobile was recently parked and, accordingly, less likely to move.

In some cases, the thermal data may be utilized to perform instance segmentation of the components or features of the object. For instance, the thermal data as well as other sensor data may be input into a machine learned model to assist with identifying, bounding, and disambiguating various components or features of the object from each other. As an example, the machine learned model may utilize the thermal data to assist with segmenting the wheels of an automobile from the chassis and the like. The thermal data may also be used to classify the object and/or component/features of the object. For instance, the thermal data may be utilized by a machine learned model to identify two different types of automobiles, such as a truck from a sedan, or different types of animals, such as a cat from a squirrel. In the automobile example, the thermal data may assist in classification as the engine may be more easily detected and the machine learned model may understand that particular engine locations are associated with particular makes and models of various automobiles.

In other cases, the thermal data may be input into a separate machine learned model that may for instance receive the classified and/or segmented object data as an input. In this case, the thermal data may be used by the subsequent machine learned model to generate status, predicted behavior, confidence values, and the like. In still other cases, the thermal data may be input into a separate machine learned model that provides an output such as segmented and/or classified objects to a subsequent machine learned model that may output the status, predicted behavior, or confidence values and the like. In this example, the subsequent machine learned model may also receive object data from other models operating in parallel to the thermal data model. For instance, the parallel models may process image data, lidar data, location data, and the like. In some specific examples, the thermal data may be processed as a separate head of a shared machine learned model to segment, classify, and predict behavior of objects within the environment surrounding the autonomous vehicle.

In some examples, the autonomous vehicle may also utilize a thermal signature gradient or change over a period of time (such as a set number of milliseconds or seconds) to assist in determining the confidence value for the predicted behavior. For example, if the tires of the automobile, in the above examples, indicate a cooling tendency, then it is more likely the automobile was recently parked and therefore the predicted behavior with respect to the automobile moving may be reduced and the confidence value associated with the static state of the vehicle may be increased.

In this manner, the autonomous vehicle and/or a related system may increase the reliability of the predicted behavior of various dynamic or potentially dynamic objects in the environment about the autonomous vehicle, thereby improving the overall safely associated with the autonomous operations of the vehicle. Although examples are described in the context of autonomous vehicles, the techniques described herein are not limited to use with autonomous vehicles and may be used to segment, classify, and determine predicted behavior of objects in other contexts, such as manufacturing, video games, and the like.

FIG. 1 is an example block-diagram illustrating an example architecture 100 associated with operational decisions of an autonomous vehicle, in accordance with embodiments of the disclosure. As discussed above, sensor systems 102 of an autonomous vehicle may capture sensor data 104. The sensor data 104 may include image data, inertial measurement unit data, point cloud data, radar data, thermal data 110, lidar data, and/or other data representations of the physical environments traversed by the vehicle. In some examples, the autonomous vehicle may be following a reference trajectory to a desired destination. As the vehicle travels through the physical environment, the vehicle may capture sensor data 104 representative of the nearby static and/or dynamic objects that may be considered when making operational decisions.

The sensor data 104 may be processed by a perception and prediction system 106. For instance, the perception and prediction system 106 may perform classification, segmentation, and/or otherwise process the sensor data 104 to identify one or more objects (e.g., pedestrians, vehicles, animals, and the like) within the environment surrounding the autonomous vehicle. In some cases, the perception and prediction system 106 may perform object segmentation, feature extraction, sparse features representation, pattern detection, white space detection, pixel correlation, feature mapping, etc. and utilize one or more neural networks, deep learning, and/or regression techniques to detect, classify, and predict a motion trajectory of the object. For example, details of classification and/or segmentation are discussed in U.S. application Ser. Nos. 16/238,475 and 16/732,243, which are herein incorporated by reference in their entirety and for all purposes. The output of the perception and prediction system 106 may include object data 108, such as type of the objects, classification of the objects, characteristics of the objects, predicted behaviors of the objects, and states of the objects, and the like. In some cases, the predicted behavior and/or state of one or more objects may have associated confidence data 112 or confidence values usable by an operational decision component 114 to make operational decisions for the autonomous vehicle. In the illustrated example, the object data 108 from the perception and prediction system 106 may be received by the thermal analysis component 116. As illustrated herein, the thermal analysis component 116 is independent from the perception and prediction system 106, however, it should be understood that, in some alterative examples, the thermal analysis component 116 may be incorporated into the perception and prediction system 106.

The thermal analysis component 116 may, for individual objects and/or components of individual objects, determine a heat signature. For example, the thermal analysis component 116 may segment and classify the thermal data into one or more heat signatures for each object and/or component of an object. The thermal analysis component 116 may then generate confidence data 112 associated with each predicted behavior and/or state of the individual objects and/or components. In some cases, the thermal analysis component 116 may determine if a predetermined combination of heat signatures of the components of an object meet or exceed various associated thresholds. In some cases, the predetermined combination may be selected based on a classification of the object and/or components of the object. For example, specific types (e.g., makes and models) of engines may generate different heat signatures from each other in different situations.

In some examples, the thermal analysis component 116 may analyze thermal signatures of combinations of related or otherwise interacting dynamic objects. For example, the thermal sensor data may represent an automobile with an individual positioned within. In this example, the thermal analysis component 116 may segment and classify the thermal sensor data to identify heat signatures of components of the automobile and a heat signature of the individuals. The thermal analysis component 116 may then update, generate, or otherwise assign confidence values or data 112 to particular predicted behaviors and/or states based on one or more predetermined combinations, as discussed above, as well as with respect to interactions between the heat signatures. For instance, if the heat signature represents a hand of the driver on the steering wheel of a parked automobile with the heat signature of the tires and engine being equal to or below corresponding thresholds, the thermal analysis component 116 may increase a confidence value associated with a predicted behavior of the automobile preparing to back up while substantially simultaneously decreasing a confidence value that the automobile has recently parked. In some examples, the thermal analysis component 116 may also receive the thermal data 110 over a period of time. The thermal analysis component 116 may then utilize a change in the thermal signatures over the period of time to assist in determining the confidence data 112 for the predicted behaviors.

In the current example, the thermal analysis component 116 is shown as optionally incorporated into the perception and prediction systems 106. Accordingly, in some cases, the thermal analysis component 116 may generate an output that is an input to the perception system and/or prediction systems 106, receive an output of the perception systems and/or prediction systems 106 as an input or operate in parallel to the perception systems and/or prediction systems 106. In the illustrated example, the thermal analysis component 116 may be a layer of or part of a neural network or machine learned model associate with the perception systems and/or prediction systems 106. In some cases, the object data 108 and/or the confidence data 112 may be both output by one or more of the machine learned models associate with the perception systems, prediction systems, and/or the thermal analysis component 116 as well as received as an input.

In this example, the object data 108 (including the state data of the objects and predicted behaviors) together with the confidence data 112 may be received at the operational decision component 114. The operational decision component 114 may comprise one or more of a trajectory planning system, a collision prediction system, a drivable area determining system, and/or the like. In this example, the operational decision component 114 may utilize the object data 108 and the confidence data 112 to make operational decisions and send control signals 120 to a drive system 118 of the vehicle.

In some instances, the thermal data 110 may also be used to predict by the thermal analysis component 116 a malfunction or issue with an object in the physical environment. For example, the thermal analysis component 116 may determine that an automobile's engine or battery is meeting or exceeding an expected or known operating temperature. In this case, the control signal 120 may cause the autonomous vehicle to avoid approaching the automobile as the automobile may have component failure or otherwise act in an unexpected manner. In other cases, the control signal 120 may cause the autonomous vehicle to increase or utilize expanded safety metrics or rules with respect of the automobile.

Figure 2:
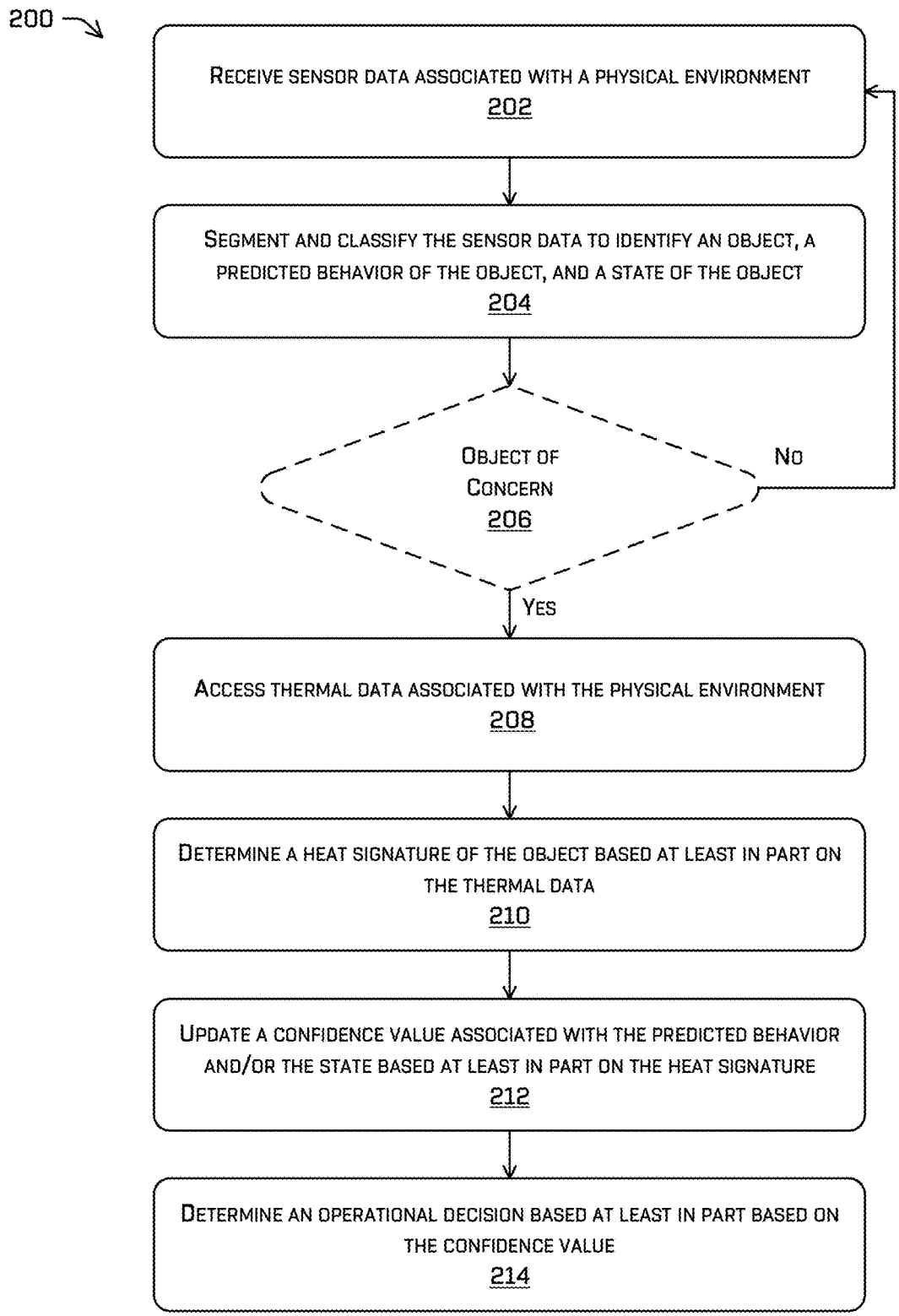
FIG. 2 is a flow diagram illustrating an example process associated with the thermal analysis systems, in accordance with implementations of the disclosure.
Figure 3:
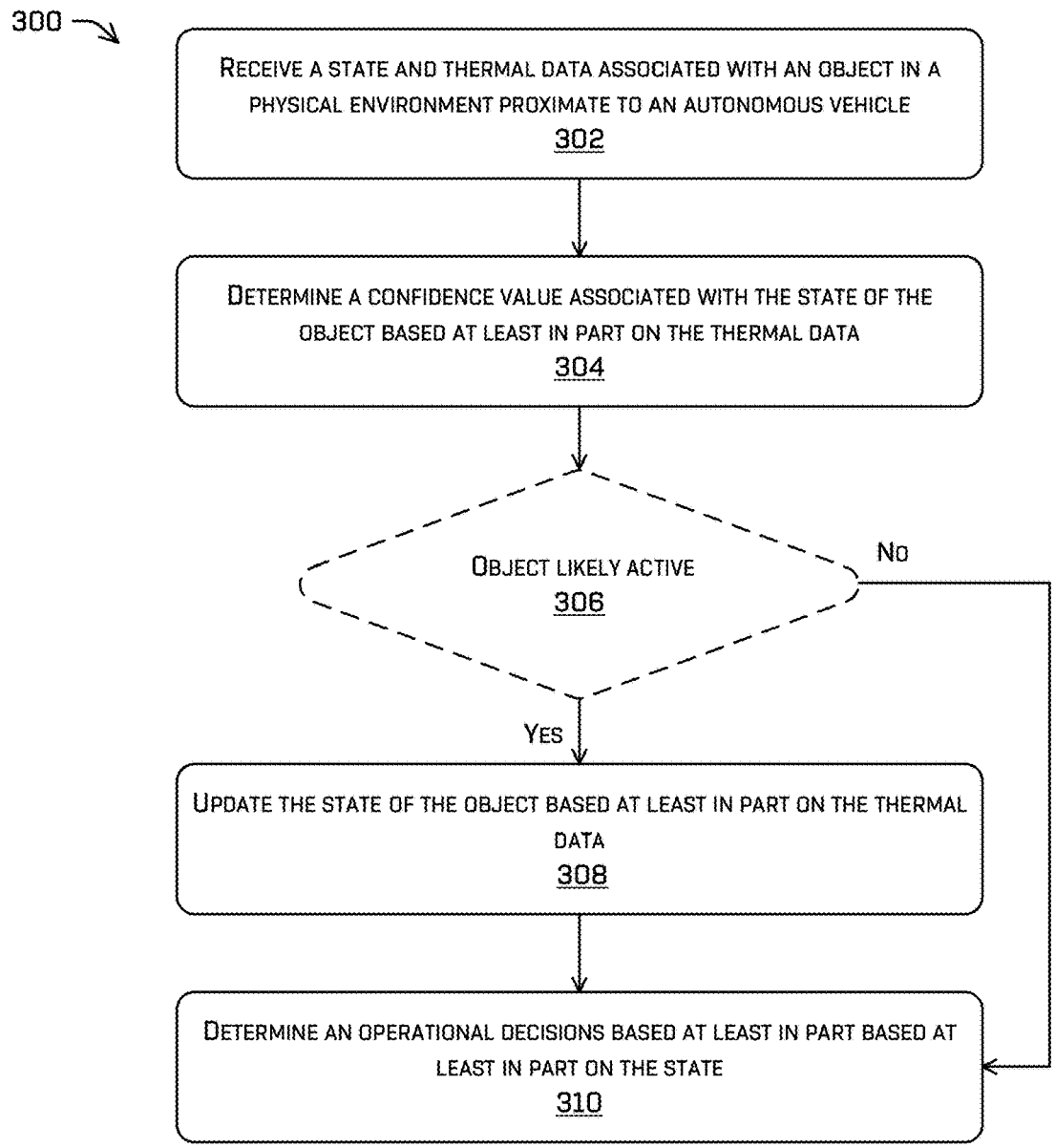
FIG. 3 is a flow diagram illustrating an example process associated with the thermal analysis systems, in accordance with implementations of the disclosure.
Figure 4:
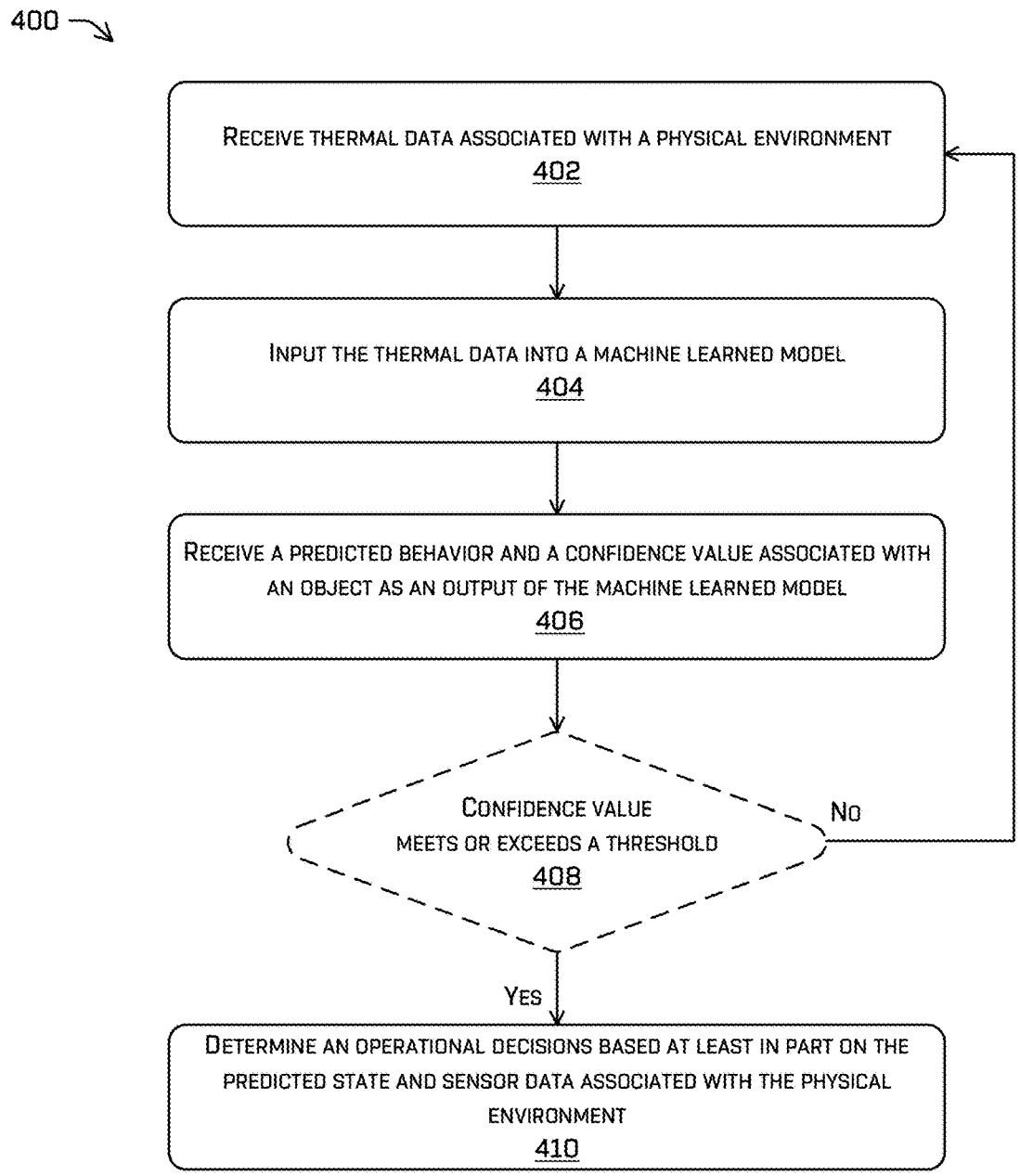
FIG. 4 is a flow diagram illustrating an example process associated with the thermal analysis systems, in accordance with implementations of the disclosure.

FIGS. 2-4 are flow diagrams illustrating example processes associated with the thermal analysis systems and components discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 2 is a flow diagram illustrating an example process 200 associated with the thermal analysis systems, in accordance with implementations of the disclosure. As discussed herein, autonomous vehicles may capture sensor data associated with a surrounding physical environment. The autonomous vehicle may parse, extract, segment, and classify the sensor data to identify and classify nearby objects. The autonomous vehicle may also determine a state of the nearby objects and predicted behaviors of any dynamic objects. The autonomous vehicle may then make operational decisions based on the predicted behaviors and current states of each nearby object. For example, details related to predicted behaviors and operational decisions based on those predicted behaviors are discussed in U.S. application Ser. No. 16/151,607, which is herein incorporated by reference in its entirety and for all purposes. In some cases, the autonomous vehicle may also utilize thermal data associated with the detected object to reduce uncertainty and/or update a confidence value associated with predicted behaviors and/or states of one or more of the detected objects.

At 202, an autonomous vehicle may receive sensor data associated with a physical environment the vehicle is traversing through. For example, the sensor data may comprise time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, thermal sensors, etc.

At 204, the autonomous vehicle may segment and classify the sensor data to identify an object, a predicted behavior of the object, and a state of the object. For example, the vehicle may identify static and dynamic objects in the surrounding physical environment. The vehicle may also determine the predicted behaviors and states of the dynamic objects which may then be used to make operational decisions. As discussed herein, the predicted behaviors and/or states may have an associated confidence value that may be used to assist the autonomous vehicle in responding more accurately to the predicted behavior or changes in state of the dynamic objects, thereby providing a safer experience for the passengers.

At 206, the autonomous vehicle may determine if one or more of the objects are of concern. For example, if the predicted behavior of the object has a high confidence value, is below a confidence threshold and/or the state of the object (such as active or inactive for a parked automobile) is unknown, the object may be of concern. If the autonomous vehicle does not detect an object of concern, then the process 200 may return to 202. Otherwise, the process 200 proceeds to 208.

At 208, the autonomous vehicle may access thermal data associated with the physical environment and, at 210, the autonomous vehicle may determine a heat signature of the object based at least in part on the thermal data. For example, the autonomous vehicles or a component thereof (such as a thermal analysis component or system) may utilize one or more machine learned models to segment and classify the thermal data as corresponding to the object and/or components or features of the object.

At 212, the autonomous vehicle may update a confidence value associated with the predicted behavior and/or the state based at least in part on the heat signature. For example, the autonomous vehicles may utilize one or more additional machine learned models that receive the heat signature of the object and/or components/features of the object to generate a confidence value associated with a corresponding predicted behavior and/or state. For example, a parked automobile may have a first heat signature associated with the tires, a second heat signature associated with the lights, and a third heat signature associated with the engine. As an illustrative example, the predicted behavior may be that the parked vehicle will begin to travel in a first direction. In this example, the model may output a confidence value associated with the predicted behavior based on the heat signatures of the tires, lights, and engine. For instance, if the tires are warm, the engine is hot, and the lights are cool, it is more likely the vehicle recently parked and is, accordingly, less likely to move. Therefore, the autonomous vehicle may reduce the confidence value associated with the parked vehicle traveling in a first direction. Alternatively, if the tires are cool, the engine is warm, and the lights are hot, it is more likely the vehicle recently engaged or activated and, therefore, it is more likely the automobile will travel in the first direction. Thus, the autonomous vehicle may increase the confidence value associated with the parked vehicle traveling in a first direction.

At 214, the autonomous vehicle may determine an operational decision based at least in part on the confidence value. For instance, in the example, if the automobile determines the most likely predicted behavior based on the confidence value is that the automobile will travel in the first direction, then the autonomous vehicle may stop to allow the parked automobile to proceed and avoid any potential collision.

FIG. 3 is a flow diagram illustrating an example process 300 associated with the thermal analysis systems, in accordance with implementations of the disclosure. As discussed herein, autonomous vehicles may identify objects within a surrounding physical environment. The autonomous vehicle may also determine a state (such as active or inactive) of the nearby objects. The autonomous vehicle may then make operational decisions based on the state of each nearby object. In some cases, if a state of an object is inactive (such as a parked automobile), the autonomous vehicle may be confident that the automobile will not move or may otherwise be treated as a static object, thereby reducing computational complexity with respect to making operational decisions.

At 302, an autonomous vehicle may receive a state and thermal data associated with an object in a physical environment proximate to an autonomous vehicle. For example, the vehicle may segment and classify sensor data associated with the physical environment in order to identify static and dynamic objects as well as state data associated with each identified object.

At 304, the autonomous vehicle may determine a confidence value associated with the state of the objects based at least in part on the thermal data. For example, the autonomous vehicles or a component thereof (such as a thermal analysis component or system) may utilize one or more machine learned models to segment and classify the thermal data as corresponding to the object and/or components or features of the object. The autonomous vehicle may then determine, based on the classified thermal data (such as a heat signature of a combination of components or features), a confidence value associated with the state of each object. For instance, a state of an automobile may be active or inactive.

At 306, the autonomous vehicle may determine if the object is likely to be active. For example, the autonomous vehicle may utilize the confidence value of the state or states of the object to determine if the object is more likely active (e.g., dynamic) or inactive (e.g., static). As one example, the autonomous vehicle may utilize the thermal data and/or one or more machine learned models to determine if the object is active and/or inactive. For instance, the autonomous vehicle may determine that the object is active when a combination of features or components of the object have specific heat signatures and/or temperatures. If the object is likely to be inactive, then the process 300 may move to 306. Otherwise, the process 300 advances to 308. At 308, the autonomous vehicle may update a state associated with the object based at least in part on the thermal data. For example, the autonomous vehicles may assign a predicted behavior and/or assign features or charactertics of a sub-state (such as a direction of travel, acceleration, and the like). In some alternative examples, the process 300, may proceed from 304 to 306. For instance, the active/inactive status may be determined together with the confidence value.

At 310, the autonomous vehicle may determine an operational decision based at least in part on the state. For instance, in the example, if the object state is inactive, the autonomous vehicle may treat the object as static. Alternatively, if the object is active then the autonomous vehicle may consider the characteristics, predicted behavior, and features of the object when making the operational decisions together with data associated with other dynamic objects.

FIG. 4 is a flow diagram illustrating an example process 400 associated with the thermal analysis systems, in accordance with implementations of the disclosure. As discussed herein, autonomous vehicles may capture sensor data, including thermal data, associated with a surrounding physical environment. The autonomous vehicle may parse, extract, segment, and classify the sensor data to identify and classify nearby objects. The autonomous vehicle may also determine a state of the nearby objects and predicted behaviors of any dynamic objects. The autonomous vehicle may then make operational decisions based on the predicted behaviors and current states of each nearby object.

At 402, the thermal analysis system or component of an autonomous vehicle may receive thermal data associated with a physical environment. For example, the thermal analysis system may receive the thermal data from a thermal imaging system or thermal sensor system associated with the autonomous vehicle. The thermal data may be received at various intervals such as a periodic interval.

At 404, the thermal analysis system may input the thermal data into a machine learned model and, at 406, the thermal analysis system may receive a predicted behavior and a confidence value associated with the object as an output of the machine learned model. The machine learned model may be configured to segment, classify, and/or otherwise identify objects and/or components or features of objects from the provided thermal data. In some cases, the thermal analysis system may also input objects or features classified by a perception system associated with the autonomous vehicle in addition to the thermal data.

In some cases, the machine learned models may comprise one or more neural networks configured to generate any number of learned inferences or output heads. In some cases, the neural network may be a trained network architecture that is end-to-end. In one example, the machine learned models may include segmenting, clustering, and/or classifying extracted deep convolutional features of the thermal data into semantic data (e.g., objects, features, components, temperatures, temperature changes, and the like). In some cases, appropriate truth outputs of the model in the form semantic per-pixel, per-region, or per data point classifications.

At 408, the thermal analysis system may determine if the confidence value meets or exceeds a threshold. If the confidence value does meet or exceed the threshold, the process 400 may advance to 410. Otherwise, the process 400 may return to 402 to process additional thermal data and/or perform an emergency operation, such as halting the vehicle. At 410, the autonomous vehicle may determine an operational decision based at least in part on the predicted behavior. For instance, the autonomous vehicle may respond to the predicted behavior by accelerating, decelerating, maintaining a current course, and the like.

Figure 5:
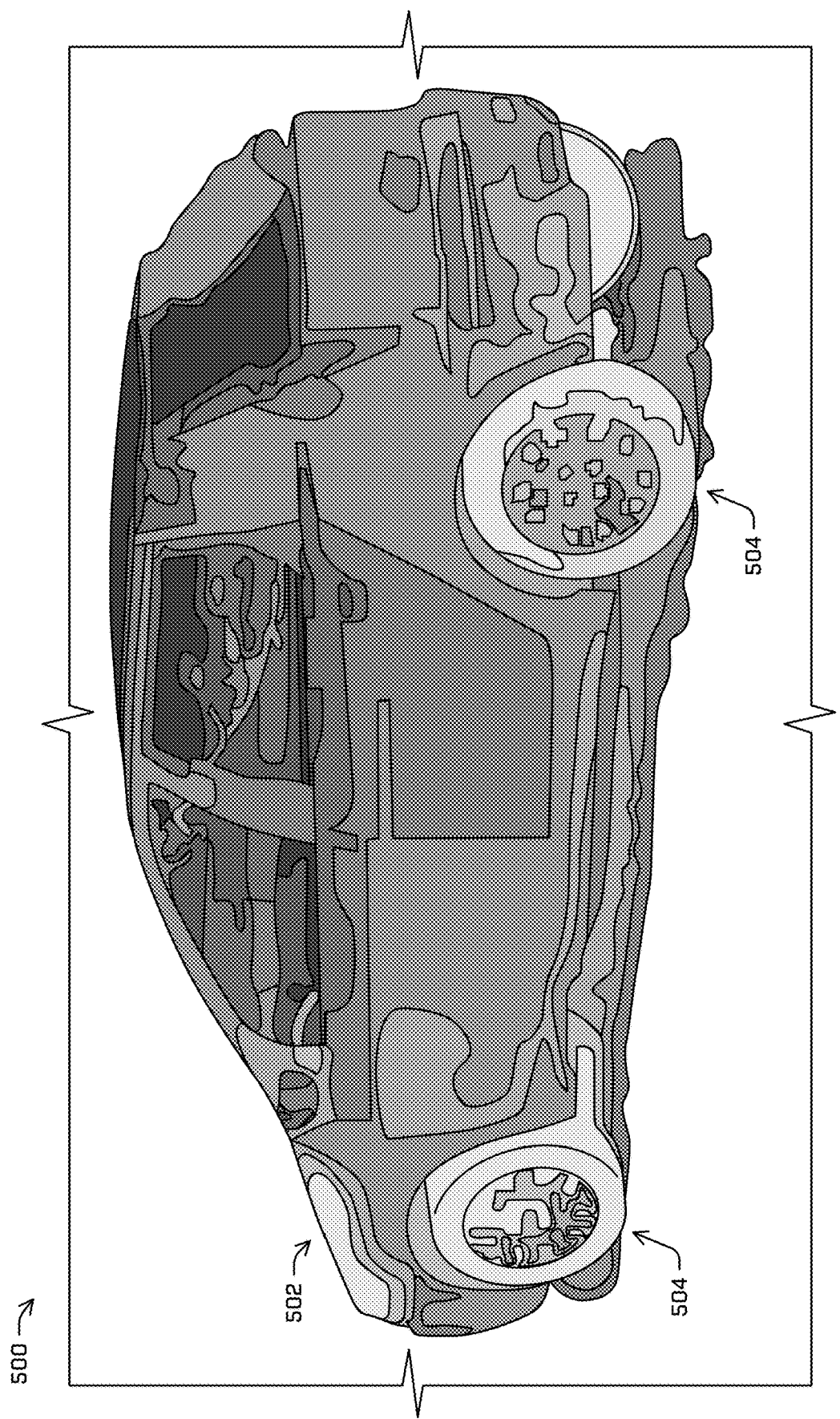
FIG. 5 is a pictorial diagram illustrating an example heat signature of various components of an object, in accordance with implementations of the disclosure.

FIG. 5 is a pictorial diagram illustrating an example heat signature of various components of an object 500, in accordance with implementations of the disclosure. In the current example, the object 500 is an automobile that may have recently parked at a location. In this example, the autonomous vehicle traveling in proximity to the automobile 500 may have recently parked. However, the autonomous vehicle may have difficulties in determining a predicted behavior and/or state of the automobile, as the automobile may be static or dynamic depending on whether or not the automobile is on and/or running.

In this example, the autonomous vehicle may utilize thermal data of the automobile and/or components of the automobile to assist with determining and/or updating a confidence value associated with the predicted behaviors and/or state. For instance, in the illustrated example, the engine 502 and the tires 504 are both hot, as indicated by the light color of the corresponding thermal data. In some cases, the autonomous vehicle may input the thermal data of the object 500 (e.g., the automobile) into a machine learned model and/or network which may segment, classify, and otherwise determine heat signatures of various components of the automobile 500, such as the engine 502 and/or the tires 504. The autonomous vehicle may then either use the same or a subsequent machine learned model and/or network to process the thermal signatures of the combination of components (such as a predetermined combination of components or features) to receive an outputted confidence value associated with one or more predicted behaviors and/or states. For instance, in the illustrated example, the confidence value associated with the automobile 500 recently parking may be high as the automobile 500 is parked, the tires 504 and the engine 502 are hot and, accordingly, were recently in use. Similarly, a confidence value associated with a static state of the automobile 500 may also be high.

Figure 6:
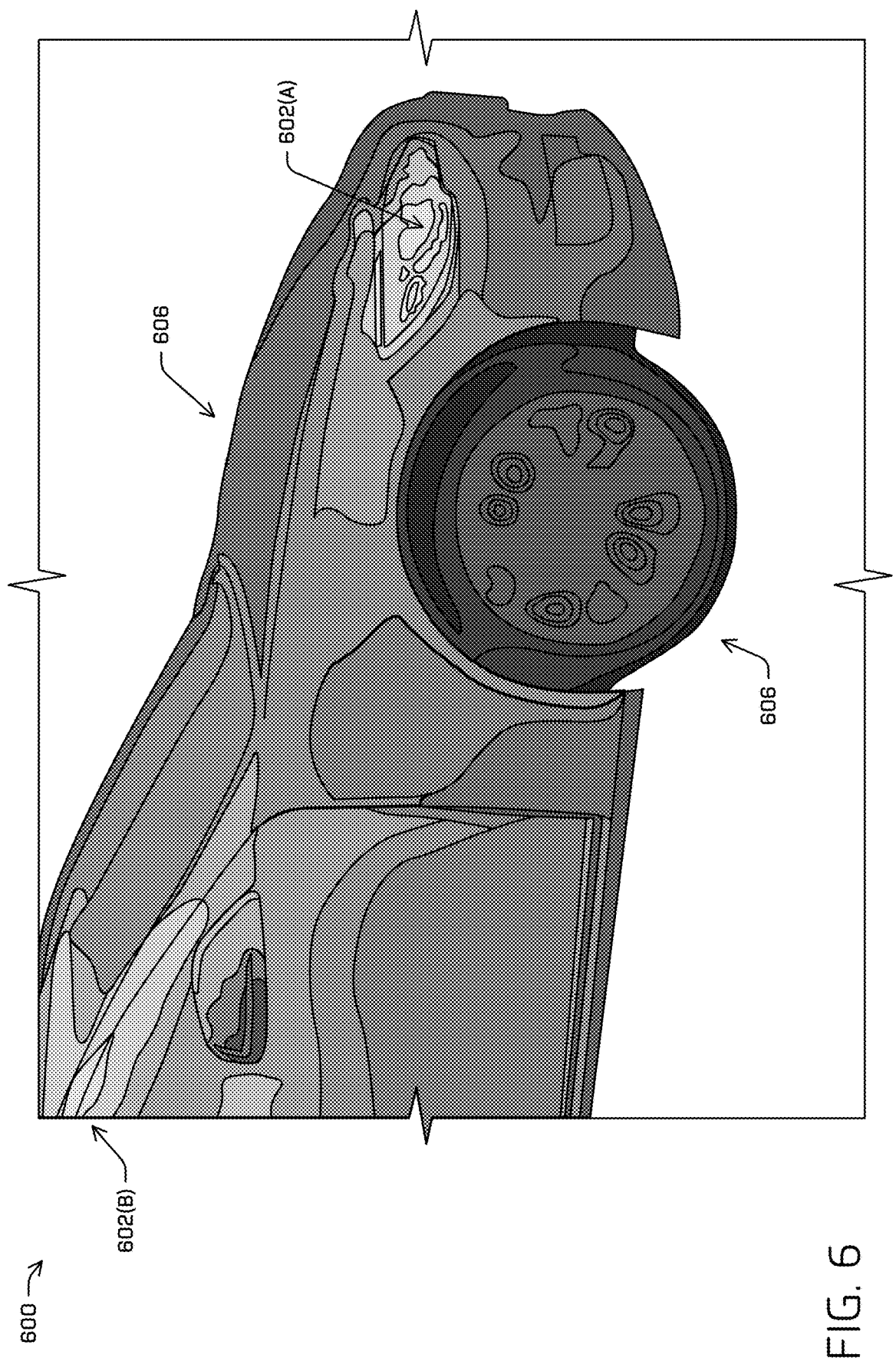
FIG. 6 is another pictorial diagram illustrating an example heat signature of various components of an object, in accordance with implementations of the disclosure.

FIG. 6 is another pictorial diagram illustrating an example heat signature of various components of an object 600, in accordance with implementations of the disclosure. In the current example, the object 600 again is an automobile that may have recently parked at a location. In this example, the autonomous vehicle traveling in proximity to the automobile 600. However again, the autonomous vehicle may have difficulties in determining a predicted behavior and/or state of the automobile, as the automobile may be static or dynamic depending on whether or not the automobile is on and/or running.

In this example, the autonomous vehicle may utilize thermal data of the automobile and/or components of the automobile to assist with determining and/or updating a confidence value associated with the predicted behaviors and/or state. For instance, in the illustrated example, the lights 602 (e.g., the headlights 602(A) and the interior lights 602(B)) are warm while the engine 604 and the tires 606 are cool, as indicated by the corresponding thermal data. In this example, the autonomous vehicle may input the thermal data of the object 600 (e.g., the automobile) into a machine learned model and/or network which may segment, classify, and otherwise determine heat signatures of various components, such as components 602-606, of the automobile 600. The autonomous vehicle may then either use the same or a subsequent machine learned model and/or network to process the thermal signatures of the combination of components 602-606 (such as a predetermined combination of components or features) to receive an outputted confidence value associated with one or more predicted behaviors and/or states. For instance, in the illustrated example, the confidence value associated with the automobile 600 preparing to depart the parking spot may be high as the automobile 600 is parked, the tires 606 and the engine 604 are cool while the lights 602 are warm. Similarly, a confidence value associated with a dynamic state of the automobile 600 may also be high.

Figure 7:
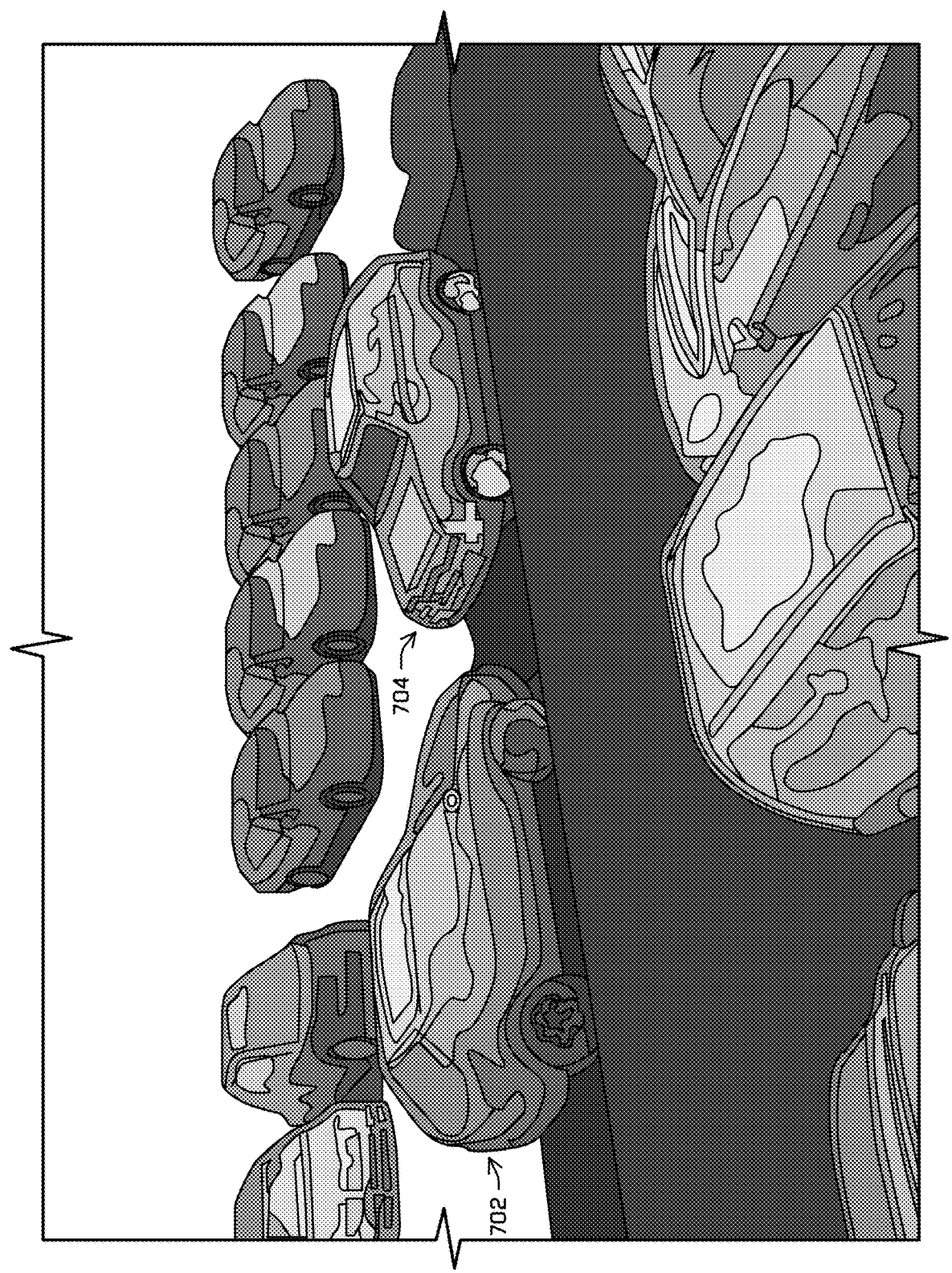
FIG. 7 is a pictorial diagram illustrating an example heat signature of various objects, in accordance with implementations of the disclosure.

FIG. 7 is a pictorial diagram 700 illustrating an example heat signature of various objects, in accordance with implementations of the disclosure. In this example, a first object 702 and a second object 704 are a first automobile and a second automobile that have double parked a subsequent row of parked automobiles. In this situation, the autonomous vehicle may have difficult in determining a high confidence associated with a predicted behavior of the first automobile 702 and/or the second automobile 704. Again, the autonomous vehicle may utilize the thermal data captured with respect to the first automobile 702 and the second automobile 704 to assign and/or update a confidence value associated with one or more predicted behaviors of each of the automobiles 702 and 704. For example, the autonomous vehicle may have to determine if either automobile is in an active state, which automobile 702 or 704, if any, are likely to move, and in what direction each is likely to travel. As illustrated, the roof of the first automobile 702 is warm and the tires are cool, indicating that the first automobile 702 has been parked for some time and the autonomous vehicle may utilize this combination of heat signatures to determine that the first automobile 702 is likely in a static state despite being double parked. On the other hand, the second automobile 704 has an engine, tires, and lights that are warm indicating that the second automobile 704 is in an active state and may attempt to drive around the double parked first automobile 702 (thus being more likely to enter oncoming traffic). In this example, the autonomous vehicle may utilize the heat signature and thermal data of the first and second automobiles 702 and 704 to increase a confidence value associated with a predicted behavior of both automobiles 702 and 704 as well as a known situation (e.g., of a double parked car blocking oncoming traffic). In this manner, the autonomous vehicle may update its operational decisions to respond to the known situation and proceed more cautiously past the first and second automobile 702 and 704.

Figure 8:
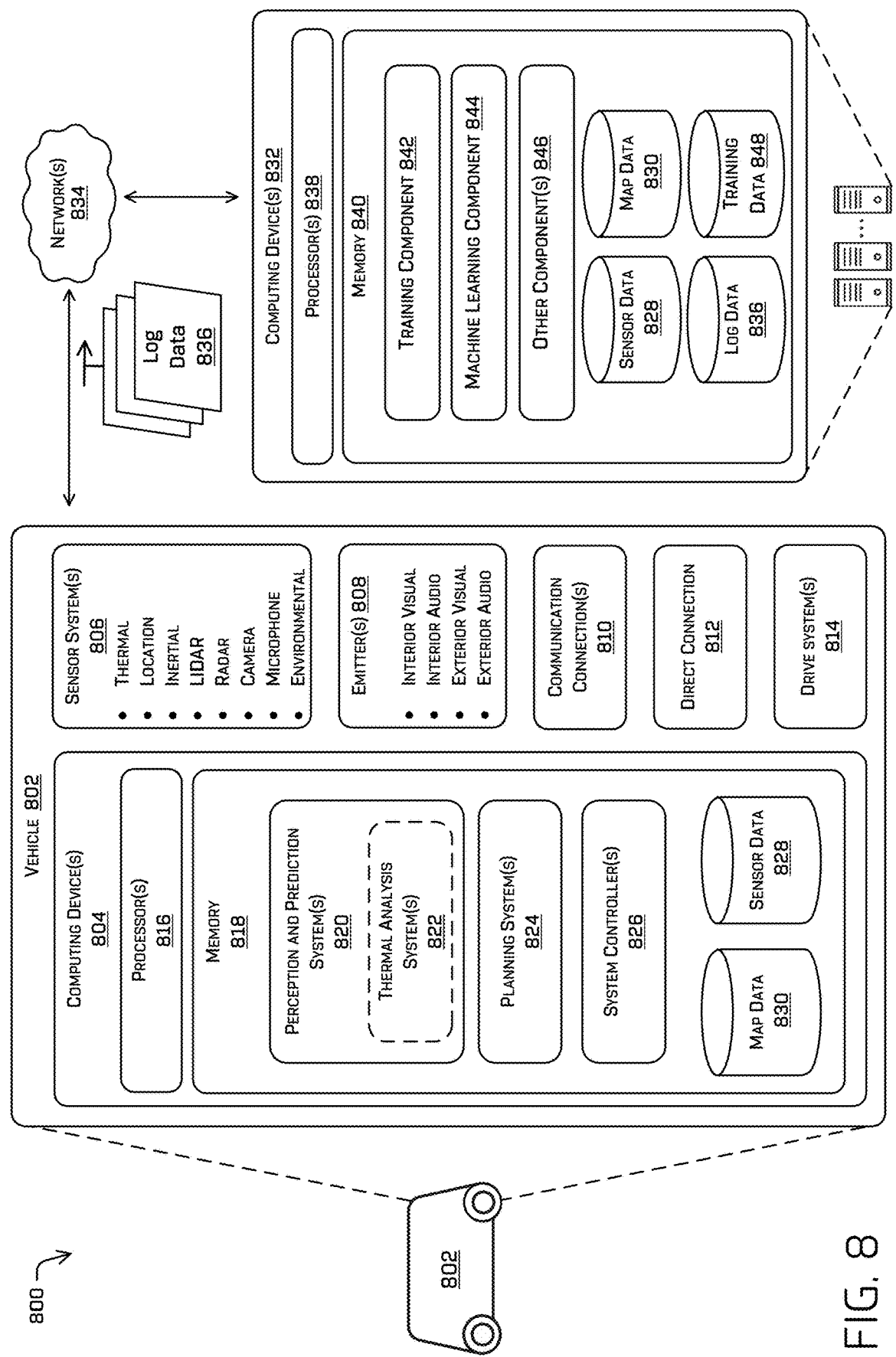
FIG. 8 depicts a block diagram of an example system for implementing the techniques discussed herein.

FIG. 8 depicts a block diagram of an example system 800 for implementing the techniques discussed herein. In at least one example, the system 800 may include a vehicle 802, such the autonomous vehicles discussed above. The vehicle 802 may include computing device(s) 804, one or more sensor system(s) 806, one or more emitter(s) 808, one or more communication connection(s) 810 (also referred to as communication devices and/or modems), at least one direct connection 812 (e.g., for physically coupling with the vehicle 802 to exchange data and/or to provide power), and one or more drive system(s) 814. The one or more sensor system(s) 806 may be configured to capture the sensor data 806 associated with a surrounding physical environment.

In at least some examples, the sensor system(s) 806 may include thermal sensors, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 806 may include multiple instances of each type of sensor. For instance, time-of-flight sensors may include individual time-of-flight sensors located at the corners, front, back, sides, and/or top of the vehicle 802. As another example, camera sensors may include multiple cameras disposed at various locations about the exterior and/or interior of the vehicle 802. In some cases, the sensor system(s) 806 may provide input to the computing device(s) 804.

The vehicle 802 may also include one or more emitter(s) 808 for emitting light and/or sound. The one or more emitter(s) 808 in this example include interior audio and visual emitters to communicate with passengers of the vehicle 802. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 808 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 802 can also include one or more communication connection(s) 810 that enables communication between the vehicle 802 and one or more other local or remote computing device(s) (e.g., a remote teleoperations computing device) or remote services. For instance, the communication connection(s) 810 can facilitate communication with other local computing device(s) on the vehicle 802 and/or the drive system(s) 814. Also, the communication connection(s) 810 may allow the vehicle 802 to communicate with other nearby computing device(s) (e.g., other nearby vehicles, traffic signals, etc.).

The communications connection(s) 810 may include physical and/or logical interfaces for connecting the computing device(s) 804 to another computing device or one or more external network(s) 834 (e.g., the Internet). For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 810 may comprise the one or more modems as described in detail above.

In at least one example, the vehicle 802 may include one or more drive system(s) 814. In some examples, the vehicle 802 may have a single drive system 814. In at least one example, if the vehicle 802 has multiple drive systems 814, individual drive systems 814 may be positioned on opposite ends of the vehicle 802 (e.g., the front and the rear, etc.). In at least one example, the drive system(s) 814 can include one or more sensor system(s) 806 to detect conditions of the drive system(s) 814 and/or the surroundings of the vehicle 802. By way of example and not limitation, the sensor system(s) 806 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 814. In some cases, the sensor system(s) 806 on the drive system(s) 814 can overlap or supplement corresponding systems of the vehicle 802 (e.g., sensor system(s) 806).

The drive system(s) 814 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 814 can include a drive system controller which may receive and preprocess data from the sensor system(s) 806 and to control operation of the various vehicle systems. In some examples, the drive system controller can include one or more processor(s) and memory communicatively coupled with the one or more processor(s).

The memory can store one or more modules to perform various functionalities of the drive system(s) 814. Furthermore, the drive system(s) 814 also include one or more communication connection(s) that enable communication by the respective drive system with one or more other local or remote computing device(s).

The computing device(s) 804 may include one or more processors 816 and one or more memories 818 communicatively coupled with the processor(s) 816. In the illustrated example, the memory 818 of the computing device(s) 804 stores perception system(s) 820, prediction system(s) 822, planning system(s) 824, as well as one or more system controller(s) 826. The memory 818 may also store data such as sensor data 828 captured or collected by the one or more sensors systems 806 and map data 830. Though depicted as residing in the memory 818 for illustrative purposes, it is contemplated that the perception and prediction system(s) 820, thermal analysis system(s) 822, planning system(s) 824, as well as one or more system controller(s) 826 may additionally, or alternatively, be accessible to the computing device(s) 804 (e.g., stored in a different component of vehicle 802 and/or be accessible to the vehicle 802 (e.g., stored remotely).

The perception and prediction system 820 may be configured to perform object detection, segmentation, and/or classification on the sensor data 828 and/or the map data 830. In some examples, the perception and prediction system 820 may generate processed perception data from the sensor data 828. The perception data may indicate a presence of objects that are in physical proximity to the vehicle 802 and/or a classification or type of the objects (e.g., car, pedestrian, cyclist, building, tree, road surface, curb, sidewalk, unknown, etc.). In some cases, the perception data may be integrated into the map data 830 such as via a semantic layer of a multi-resolution voxel space. In additional and/or alternative examples, the perception and prediction system 820 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc.

The perception and prediction system 820 may also be configured to determine a predicted behavior and/or state corresponding to an identified object. For example, the perception and prediction system 820 may be configured to predict a velocity, position, change in trajectory, or otherwise predict the decisions and movement of the identified objects. For example, the perception and prediction system 820 may include one or more machine learned models that may, based on inputs such as object type or classification and object characteristics, output predicted characteristics of the object at one or more future points in time. In some cases, the predicted behaviors and/or states may be assigned a confidence value, such that the behaviors and/or states may be sorted, ranked, and/or the like.

The thermal analysis system 822 is illustrated as a separate system from the perception and prediction system 820 but it should be understood that, in some examples, the thermal analysis system 822 may be integrated into the perception and prediction system 820. For example, the thermal analysis system 822 may segment and classify the thermal data into one or more heat signatures for each object and/or component of an object and/or utilize the segmented and classified data from the perception and prediction system 820. The thermal analysis system 822 may then generate confidence data or values associated with each predicted behavior and/or states of the individual identified objects and/or components of the identified objects. In some cases, the thermal analysis system 822 determines if a predetermined combination of heat signatures of the components or features of an identified object meet or exceed various associated thresholds. In some cases, the predetermined combination may be selected based on a classification of the components or features of the object. For example, specific types (e.g., makes and models) of engines may generate different heat signatures from each other in different situations.

The planning system 824 may be configured to determine a route for the vehicle 802 to follow to traverse through an environment. For example, the planning system 824 may determine various routes and paths and various levels of detail based at least in part on the identified objects, the predicted behaviors and/or states, characteristics of the object at future times, the confidence value associated with each predicted behavior or state, and a set of safety requirements corresponding to the current scenario (e.g., combination of objects detected and/or environmental conditions). In some instances, the planning system 826 may determine a route to travel from a first location (e.g., a current location) to a second location (e.g., a target location) in order to avoid an object obstructing or blocking a planned path of the vehicle 802. In some case, a route can be a sequence of waypoints for traveling between the two locations (e.g., the first location and the second location). In some cases, waypoints include streets, intersections, global positioning system (GPS) coordinates, etc.

In at least one example, the computing device(s) 804 may store one or more and/or system controllers 826, which may be configured to control steering, propulsion, braking, safety, emitters, communication, and other systems of the vehicle 802. The system controllers 826 may communicate with and/or control corresponding systems of the drive system(s) 814 and/or other components of the vehicle 802, which may be configured to operate in accordance with a route provided from the planning system 824.

In some examples, the vehicle 802 may connect to computing device(s) 832 via the network(s) 834. For example, the computing device(s) 832 may receive log data 836 from one or more vehicles 802. The log data 836 may include the sensor data 828, perception data, prediction data and/or a combination thereof. In some cases, the log data 828 may include portion of one or more of the sensor data 828, perception data and prediction data.

The computing device 832 may include one or more processors 838 and memory 840 communicatively coupled with the one or more processors 838. In at least one instance, the processor(s) 838 may be similar to the processor(s) 816 and the memory 840 may be similar to the memory 818. In the illustrated example, the memory 840 of the computing device(s) 832 stores the sensor data 828 (including thermal data), the map data 830, the log data 836, and the training data 848. The memory 840 may also store a training component 842, a machine learning component 844, as well as other components 846, such as an operating system.

In some cases, the training component 842 may generate the training data 848 using the sensor data 828, the log data 836, and/or the map data 830 received from one or more vehicles 802. For instance, the training component 842 may label data representative of events with one or more measured parameters or characteristics. The training component 842 may then use the training data 842 to train the machine learning component 844 to generate models for the thermal analysis system 822 and/or the perception and prediction system 820 in order to assign confidence values to the predicted behaviors and/or states of identified objects, as discussed above.

The processor(s) 816 of the computing device(s) 804 and the processor(s) 838 of the computing device(s) 832 may be any suitable processor capable of executing instructions to process data and perform operations as described herein. By way of example and not limitation, the processor(s) 816 and 838 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 818 of the computing device(s) 804 and the memory 840 of the computing device(s) 832 are examples of non-transitory computer-readable media. The memory 818 and 832 can store an operating system and one or more software applications, instructions, programs, and/or data to implement the methods described herein and the functions attributed to the various systems. In various implementations, the memory 818 and 832 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 818 and 832 can be implemented as a neural network.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 8 may utilize the processes and flows of FIGS. 1-7.

A non-limiting list of objects or agents may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. A system comprising: one or more processors; and one or more non-transitory computer-readable media storing instructions that, when executed by the one or more processors, cause the one or more processors to perform operations comprising: receiving thermal data representative of a physical environment, at least a portion of the thermal data representative of a first object; determining, based at least in part on the thermal data, a first feature of the first object and a second feature of the first object; determining, based at least in part on first feature and the second feature, a future predicted behavior of the first object and a first confidence values associated with the future predicated behavior; determining, based at least in part on the first future predicted behavior and the first confidence value, a predicted future location of the first object; and performing, based at least in part on the predicted future location, at least one operation associated with an autonomous vehicle.

B. The system of claim A, wherein the first object is external to the autonomous vehicle.

C. The system of claim A, the operations further comprising: determining, based at least in part on the thermal data, a first feature of a second object; and wherein determining the first confidence value associated with the first predicted behavior is based at least in part on the first feature of the second object.

D. The system of claim A, the operations further comprising: determining, based at least in part on first feature and the second feature, a second future predicted behavior of the first object; determining, based at least in part on the second future predicted behavior and the thermal data, a second confidence value associated with the second future predicted behavior of the first object; and wherein determining the predicted future location of the first object is based at least in part on the second future predicted behavior and the second confidence value.

E. The system of claim A, the operations further comprising: determining, based at least in part on the thermal data, an environmental condition of the physical environment; and wherein determining the first confidence value associated with the first predicted behavior is based at least in part on the environmental condition.

F. A method comprising: receiving thermal data representative of a physical environment associated with an autonomous vehicle, the thermal data comprises first thermal data representative of a first feature of a first object in the physical environment and second thermal data representative of a second feature of the physical environment, wherein the first object is external to the autonomous vehicle; determining, based at least in part on the first thermal data and the second thermal data, a first predicted behavior of the first object; and performing, based at least in part on the first predicted behavior, at least one operation associated with the autonomous vehicle.

G. The method of paragraph F, wherein determining the first predicted behavior of the first object is an output of a machine learned model that receives the thermal data and at least one of image data, lidar data, point cloud data, or map data as an input.

H. The method of paragraph F, further comprising: determining a confidence value associated with the first predicted behavior; and wherein performing the at least one operation associated with the autonomous vehicle is based at least in part on the confidence value.

I. The method of paragraph F, wherein the thermal data comprises third thermal data representative of a second object in the physical environment and determining the first predicted behavior of the first object is based at least in part on the third thermal data.

J. The method of paragraph F, wherein the second feature is a component associated with the first object.

K. The method of paragraph F, wherein the second feature is a component associated with a second object in the physical environment, the second object external to the autonomous vehicle and the first object.

L. The method of paragraph F, wherein the second thermal data is at least one of the following: a temperature associated with the physical environment; thermal data associate with a second object associated with the autonomous vehicle; thermal data associate with a second object external to the autonomous vehicle; or thermal data associated with a component of a second object external to the autonomous vehicle.

M. The method of paragraph L, wherein determining a first predicted behavior of the first object further comprises: identifying, based at least in part on the thermal data, the first feature and the second feature; classifying, based at least in part on the thermal data, the first feature and the second feature; and determining, based at least in part on a first temperature of the first feature, a first class of the first feature, a second temperature of the second feature, and a second class of the second feature, the predicted behavior.

N. The method of paragraph M, wherein the first temperature of the first feature is at least one of: a temperature gradient; a minimum temperature associated with the first feature; a maximum temperature associated with the first feature; a difference in temperature of the first feature at a first time and at a second time; or a heat signature of the first feature.

O. A non-transitory computer-readable medium storing instructions that, when executed, cause one or more processors to perform operations comprising: receiving thermal data representative of a physical environment associated with an autonomous vehicle, the thermal data comprises first thermal data representative of a first feature of a first object in the physical environment and second thermal data representative of a second feature of the physical environment, wherein the first object is external to the autonomous vehicle; determining, based at least in part on the first thermal data and the second thermal data, a first predicted behavior of the first object; and performing, based at least in part on the first predicted behavior, at least one operation associated with the autonomous vehicle.

P. The non-transitory computer-readable medium of paragraph O, wherein determining the first predicted behavior of the first object is an output of a machine learned model that receives the thermal data and at least one of image data, lidar data, point cloud data, or map data as an input.

Q. The non-transitory computer-readable medium of paragraph O, wherein the operations further comprise: determining a confidence value associated with the first predicted behavior; and wherein performing the at least one operation associated with the autonomous vehicle is based at least in part on the confidence value.

R. The non-transitory computer-readable medium of paragraph O, wherein the second feature is a component associated with a second object in the physical environment, the second object external to the autonomous vehicle and the first object.

S. The non-transitory computer-readable medium of paragraph O, wherein determining a first predicted behavior of the first object further comprises: identifying, based at least in part on the thermal data, the first feature and the second feature; classifying, based at least in part on the thermal data, the first feature and the second feature; and determining, based at least in part on a first temperature of the first feature, a first class of the first feature, a second temperature of the second feature, and a second class of the second feature, the predicted behavior.

T. The non-transitory computer-readable medium of paragraph S, wherein the first temperature of the first feature is at least one of: a temperature gradient; a minimum temperature associated with the first feature; a maximum temperature associated with the first feature; a difference in temperature of the first feature at a first time and at a second time; or a heat signature of the first feature.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A system comprising:
one or more processors; and
one or more non-transitory computer-readable media storing instructions that, when executed by the one or more processors, cause the one or more processors to perform operations comprising:

receiving thermal data representative of a physical environment, at least a portion of the thermal data representative of a first object;

determining, based at least in part on the thermal data, a first feature of the first object and a second feature of the first object, wherein the first feature comprises a first heat signature associated with a first component of the first object and the second feature comprises a second heat signature associated with a second component of the first object which is different from the first component;

determining, based at least in part on the first feature and the second feature, a first future predicted behavior of the first object and a first confidence value associated with the first future predicted behavior;

determining, based at least in part on the first future predicted behavior and the first confidence value, a predicted future location of the first object; and performing, based at least in part on the predicted future location, at least one operation associated with an autonomous vehicle.

2. The system as recited in claim 1, wherein the first object comprises a vehicle, wherein the first component comprises an engine, a battery, a tire, a driver, or a light of the vehicle, and wherein the second component comprises a different one of the engine, the battery, the tire, the driver, or the light.

3. The system as recited in claim 1, the operations further comprising:

determining, based at least in part on the thermal data, a first feature of a second object; and wherein determining the first confidence value associated with the first future predicted behavior is based at least in part on the first feature of the second object.

4. The system as recited in claim 1, the operations further comprising:

determining, based at least in part on the first feature and the second feature, a second future predicted behavior of the first object;

determining, based at least in part on the second future predicted behavior and the thermal data, a second confidence value associated with the second future predicted behavior of the first object; and wherein determining the predicted future location of the first object is based at least in part on the second future predicted behavior and the second confidence value.

5. The system as recited in claim 1, the operations further comprising:

determining, based at least in part on the thermal data, an environmental condition of the physical environment; and wherein determining the first confidence value associated with the first future predicted behavior is based at least in part on the environmental condition.

6. A method comprising:

receiving thermal data representative of a physical environment associated with an autonomous vehicle, the thermal data comprises first thermal data representative of a first feature of a first object in the physical environment and second thermal data representative of a second feature of the first object in the physical environment, wherein the first feature comprises a first heat signature associated with a first component of the first object and the second feature comprises a second heat signature associated with a second component of the first object which is different from the first component, and wherein the first object is external to the autonomous vehicle;

determining, based at least in part on the first thermal data and the second thermal data, a first predicted behavior of the first object; and performing, based at least in part on the first predicted behavior, at least one operation associated with the autonomous vehicle.

7. The method as recited in claim 6, wherein determining the first predicted behavior of the first object is an output of a machine learned model that receives the thermal data and at least one of image data, lidar data, point cloud data, or map data as an input.

8. The method as recited in claim 6, further comprising:

determining a confidence value associated with the first predicted behavior; and wherein performing the at least one operation associated with the autonomous vehicle is based at least in part on the confidence value.

9. The method as recited in claim 6, wherein the thermal data comprises third thermal data representative of a second object in the physical environment and determining the first predicted behavior of the first object is based at least in part on the third thermal data.

10. The method as recited in claim 6, wherein the first object comprises a vehicle.

11. The method as recited in claim 10, wherein the first component comprises an engine, a battery, a tire, a driver, or a light of the vehicle, and wherein the second component comprises a different one of the engine, the battery, the tire, the driver, or the light.

12. The method as recited in claim 6, wherein the thermal data comprises a temperature gradient.

13. The method as recited in claim 6, wherein determining the first predicted behavior of the first object further comprises:

identifying, based at least in part on the thermal data, the first feature and the second feature;

classifying, based at least in part on the thermal data, the first feature and the second feature; and determining, based at least in part on a first temperature of the first feature, a first class of the first feature, a second temperature of the second feature, and a second class of the second feature, the first predicted behavior.

14. The method as recited in claim 13, wherein the first temperature of the first feature is at least one of:

a temperature gradient;

a minimum temperature associated with the first feature;

a maximum temperature associated with the first feature;

a difference in temperature of the first feature at a first time and at a second time; or a heat signature of the first feature.

15. One or more non-transitory computer-readable media storing instructions that, when executed, cause one or more processors to perform operations comprising:

receiving thermal data representative of a physical environment associated with an autonomous vehicle, the thermal data comprises first thermal data representative of a first feature of a first object in the physical environment and second thermal data representative of a second feature of the first object in the physical environment, wherein the first feature comprises a first heat signature associated with a first component of the first object and the second feature comprises a second heat signature associated with a second component of the first object which is different from the first component, and wherein the first object is external to the autonomous vehicle;

determining, based at least in part on the first thermal data and the second thermal data, a first predicted behavior of the first object; and performing, based at least in part on the first predicted behavior, at least one operation associated with the autonomous vehicle.

16. The one or more non-transitory computer-readable media as recited in claim 15, wherein determining the first predicted behavior of the first object is an output of a machine learned model that receives the thermal data and at least one of image data, lidar data, point cloud data, or map data as an input.

17. The one or more non-transitory computer-readable media as recited in claim 15, wherein the operations further comprise:

determining a confidence value associated with the first predicted behavior; and wherein performing the at least one operation associated with the autonomous vehicle is based at least in part on the confidence value.

18. The one or more non-transitory computer-readable media as recited in claim 15, wherein the first object comprises a vehicle.

19. The one or more non-transitory computer-readable media as recited in claim 15, wherein determining the first predicted behavior of the first object further comprises:

identifying, based at least in part on the thermal data, the first feature and the second feature;

classifying, based at least in part on the thermal data, the first feature and the second feature; and determining, based at least in part on a first temperature of the first feature, a first class of the first feature, a second temperature of the second feature, and a second class of the second feature, the first predicted behavior.

20. The one or more non-transitory computer-readable media as recited in claim 19, wherein the first temperature of the first feature comprises a temperature gradient.

\* \* \* \* \*